No. 637,224.  
C. F. BAINTER.  
WATER HEATER AND PURIFIER.  
(Application filed Nov. 17, 1898.)
Patented Nov. 21, 1899.
(No Model.)
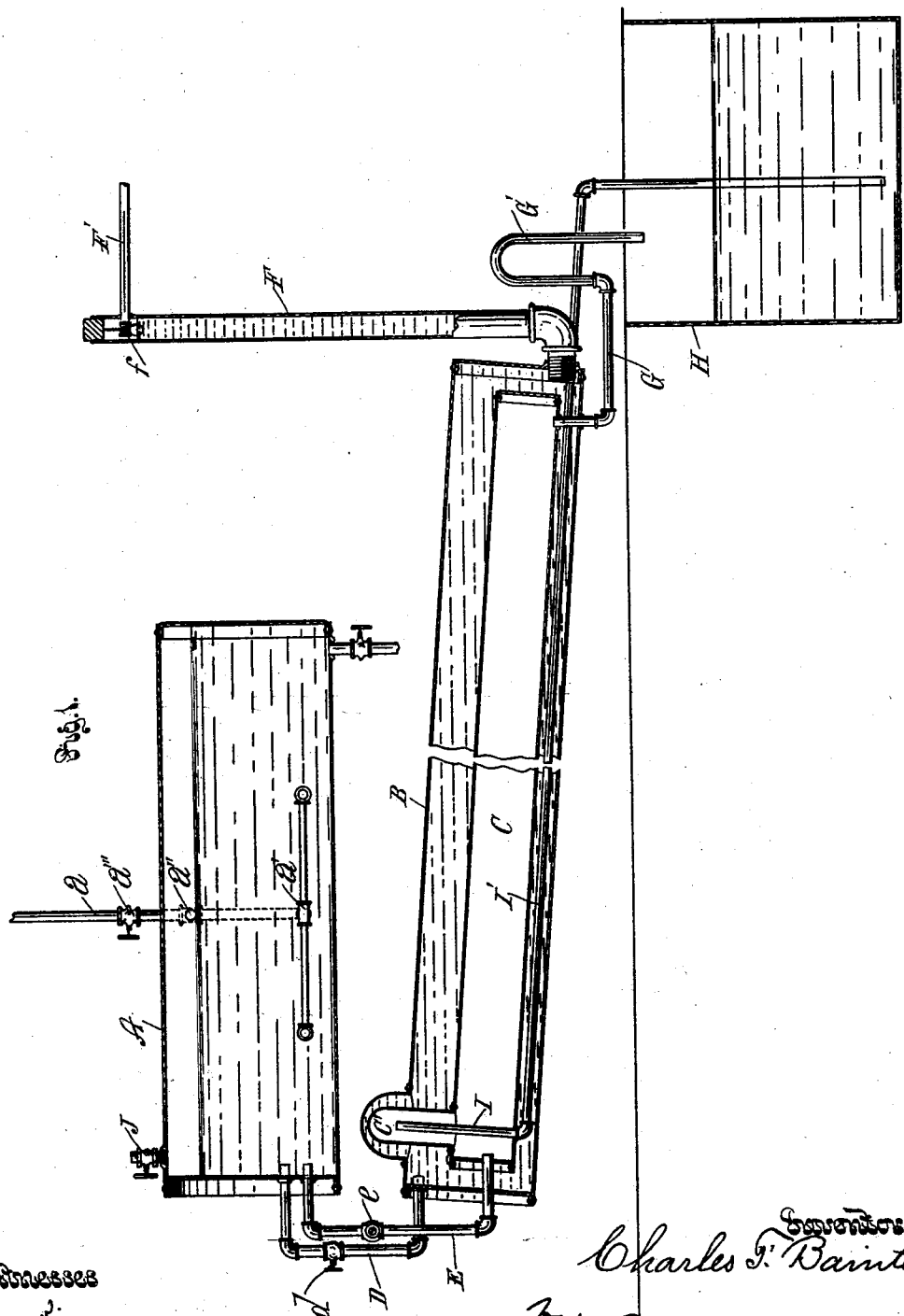

UNITED STATES PATENT OFFICE.

CHARLES F. BAINTER, OF LOS ANGELES, CALIFORNIA, ASSIGNOR OF TWO-THIRDS TO CHARLES M. PERSONS AND GEORGE W. POSSELL, OF SAME PLACE.

WATER HEATER AND PURIFIER.

SPECIFICATION forming part of Letters Patent No. 637,224, dated November 21, 1899.

Application filed November 17, 1898. Serial No. 696,668. (No model.)

*To all whom it may concern:*

Be it known that I, CHARLES F. BAINTER, a citizen of the United States, residing at Los Angeles, in the county of Los Angeles and State of California, have invented a new and useful Water Heater and Purifier for Railroad and other Purposes, of which the following is a specification.

The main objects of my invention are to provide means for economically and effectually heating and purifying water by steam for use in locomotive-boilers and other purposes, to prevent the formation of scale, to utilize heat contained in the purified water for heating the water to be purified, and generally to improve the construction and operation of apparatus of the class to which my invention relates.

The invention consists in certain novel features in the construction and arrangement of parts of apparatus for attaining the foregoing objects, as hereinafter particularly described, and pointed out in the claims.

The accompanying drawing shows in vertical longitudinal section apparatus embodying the invention.

A designates a closed purifying-tank, which may be conveniently constructed of boiler-iron and is made of sufficient strength to withstand a considerable pressure—say from eighty to one hundred pounds—such pressure being necessary to obtain the degree of heat required for the purpose of separating and precipitating the impurities held in solution by the water. $a$ is a steam-supply pipe which opens into the lower part of said tank through branch pipes $a'$ and also into the upper part thereof through branch pipes or apertures $a''$. $a'''$ is a valve for controlling the admission of steam through said pipe into said tank.

B and C are closed receiving and heating tanks arranged one within the other below the tank A. When they are made of the shape shown in the drawing, they are preferably inclined or so arranged that they will be higher at one end than at the other. The parts of the apparatus may be so connected that the inner tank will serve either as the heating or the receiving tank; but, as shown in the drawing, it is preferably arranged to serve as the heating-tank.

A pipe D, provided with a valve $d$, connects the receiving-tank B, preferably the upper part thereof, with the purifying-tank A, and a pipe E, provided with a valve $e$, connects the lower part of the purifying-tank A with the heating-tank C, preferably the upper part thereof.

F is a stand-pipe communicating at the lower end with the lower part of the receiving-tank B, and F' is a supply-pipe connecting the upper part of the stand-pipe with a source of unpurified water. The supply of water to the stand-pipe is controlled by a float-valve $f$.

G is a discharge-pipe, preferably leading out from the lower part of the heating-tank C, formed with an upward bend or extension G', arranged to maintain the water in said tank at the desired level.

H is an open cooling-tank into which the pipe G discharges.

When the parts of the apparatus are constructed and arranged as shown in the drawing, the heating-tank C is preferably formed or provided on the upper part thereof with a dome or enlargement C' to receive the steam which is given off from the hot water entering said tank. From this dome or the steam-space of the heating-tank C a pipe I I' passes through the shell of said tank, thence between the shells of the tanks B and C, along the lower side thereof, through the shell of the outer tank, at the lower end thereof, and discharges near the bottom of the cooling-tank H. A number of pipes like or similar to the pipe I may be employed, if necessary, to secure the best results, as hereinafter explained. The purifying-tank A is provided on the upper part thereof with a vent-valve J, and a blow-off pipe K, provided with a valve $k$, leads out of the bottom of said tank.

In practice the apparatus above described operates as follows: All the tanks being empty, the valve $d$ is opened and the valve $e$ is closed. The valves $f$ and J are then opened to allow water to flow from the stand-pipe F into and fill the receiving-tank B and to pass therefrom through the pipe D into and fill the purifying-tank A to the desired level, which is below the upper steam-inlet branches or openings $a''$. The valves $d$ and $J$ are then closed and the valve $a'''$ is opened, allowing steam to pass through the pipe $a$ into the tank A both above and below the surface of the water therein. The water contained in said tank is thereby quickly and economically heated to the required temperature to coagulate the impurities contained therein. The steam is then shut off from said tank and the valve $e$ is opened, thus allowing the water to flow from the tank A through the pipe E into the upper end of the heating-tank C. The capacities of the several tanks A, B, and C are approximately the same, so that when the tank C is filled to a level corresponding with the upper part of the bend or extension $G'$ of the discharge-pipe, thus leaving a steam-space in the upper part of said tank, the tank A will be nearly emptied. The pipe E preferably opens out of the tank A a little above the bottom thereof to prevent drawing therefrom any sediment which may settle therein, such sediment being removed from time to time through the blow-off pipe K by opening the valve $k$ therein. When the tank C has been thus filled, the valve $e$ is closed and the water in tank B is heated by the hot water contained in the tank C. The temperature of the water in the two tanks will soon be equalized. When the water in the tank C has been sufficiently cooled to avoid loss by evaporation and the water in tank B has been correspondingly heated, the valve $d$ is again opened, thus permitting the cold water to flow from the stand-pipe F into the lower end of the tank B, displacing the hot water therein and forcing it from the upper end of said tank through the pipe D into the tank A. In this way the heat contained in the purified water discharged from the tank A is utilized to heat the unpurified water with which said tank is supplied. When the heating-tank A is again filled to the desired level, the valve $d$ is closed and steam is admitted thereto, as before explained. When the water has been sufficiently heated in the tank A, the valve $e$ is again opened and the hot water flows from said tank into the tank C. The cooler water occupying the lower portion of said tank C is displaced by the inflowing hot water and forced therefrom through the upward bend or extension of the discharge-pipe G into the tank H. When the level of the water in stand-pipe F falls in filling the receiving-tank B, the float-valve $f$ is opened, allowing water to flow from the supply-pipe F' into said stand-pipe; but when the flow of water from the tank B is stopped by closing the valve $d$ the water will rise in said stand-pipe and close said float-valve. The steam which is given off by the hot water in the tank C collects in the upper end thereof and in the dome C', where it enters the pipe I. Passing downward through said pipe it imparts its heat to the colder portion of the water contained in tank B and is condensed, the water thus produced being discharged from said pipe into the tank H.

The operation above described may be repeated and the impurities allowed to settle in the tank H, or the water may be retained in the tank A a sufficient length of time to allow the impurities to settle therein, the sediment being drawn off through the blow-off pipe K. The water may stand in the open tank H until it is sufficiently cooled to be pumped into a supply-tank, from which it may be drawn for any desired purpose.

In practice a number of purifying-tanks may be provided for each receiving-tank and each heating-tank, since the initial heating of the water does not require as much time as does the final heating; but the relative number and arrangement of purifying, receiving, and heating tanks may be varied according to the requirements of each particular case.

I claim—

1. In a water heater and purifier the combination of a closed purifying-tank, receiving and heating tanks arranged one within the other below the purifying-tank, pipes connecting the receiving and heating tanks with the purifying-tank and provided with valves, the pipe which connects the heating and purifying tanks leading from the purifying-tank below the water-level, a steam-supply pipe opening into the purifying-tank, a water-supply pipe leading into the receiving-tank, and a discharge-pipe leading out from the heating-tank, substantially as and for the purposes set forth.

2. In a water heater and purifier the combination of a purifying-tank, receiving and heating tanks arranged one within the other below the purifying-tank, a pipe leading from the upper part of the receiving-tank into the purifying-tank, a pipe leading from the lower part of the purifying-tank into the heating-tank, a discharge-pipe leading out of the lower part of the heating-tank, a steam-supply pipe opening into the purifying-tank, and a water-supply pipe leading into the receiving-tank, substantially as and for the purposes set forth.

3. In a water heater and purifier the combination of a closed purifying-tank, closed receiving and heating tanks arranged one within the other below said purifying-tank, pipes connecting the receiving and heating tanks with the purifying-tank and provided with valves, a steam-supply pipe opening into the purifying-tank, a discharge-pipe leading out of the lower part of the heating-tank, and a pipe leading from the steam-space in the upper part of the heating-tank through the lower part of the receiving-tank, substantially as and for the purposes set forth.

4. In a water heater and purifier the combination of a closed purifying-tank, a steam-pipe leading and opening into the lower part of said tank, receiving and heating tanks arranged one within the other below said purifying-tank, pipes connecting the receiving and heating tanks with the purifying-tank, a water-supply pipe connected with the receiving-tank, and a discharge-pipe leading out of the lower part of the heating-tank, substantially as and for the purposes set forth.

5. In a water heater and purifier the combination of a closed purifying-tank, a steam-supply pipe opening into the lower part of said tank, closed receiving and heating tanks arranged one within the other below said purifying-tank, a pipe connecting the upper part of the receiving-tank with the purifying-tank and provided with a valve, a pipe connecting the lower part of the purifying-tank with the upper part of the heating-tank and provided with a valve, a water-supply connection opening into the lower part of the receiving-tank, and a discharge-pipe opening out of the lower part of the heating-tank, substantially as and for the purposes set forth.

6. In a water heater and purifier the combination of a closed purifying-tank, a steam-supply pipe opening into the upper and lower parts thereof, closed receiving and heating tanks arranged one within the other below said purifying-tank, valved pipes connecting said receiving and heating tanks with said purifying-tanks, the pipe which connects the heating and purifying tanks leading from the purifying-tank below the water-level, a water-supply pipe opening into the receiving-tank, and a discharge-pipe opening out of the heating-tank, substantially as and for the purposes set forth.

7. In a water heater and purifier the combination of a closed purifying-tank, a valved steam-supply pipe opening into said tank, closed receiving and heating tanks arranged one within the other below said purifying-tank, valved pipes connecting said receiving and heating tanks with said purifying-tank, the pipe which connects the heating and purifying tanks leading from the purifying-tank below the water-level, a discharge-pipe opening out of said heating-tank, a stand-pipe opening into the receiving-tank, a water-supply pipe opening into said stand-pipe, and a float-valve controlling the admission of water into the stand-pipe, substantially as and for the purposes set forth.

8. In a water heater and purifier the combination of a closed purifying-tank, a steam-supply pipe opening into said tank, closed receiving and heating tanks arranged one within the other below said purifying-tank, an open settling and cooling tank below the heating-tank, valved pipes connecting said receiving and heating tanks with said purifying-tank, the pipe which connects the heating and purifying tanks leading from the purifying-tank below the water-level, a water-supply pipe opening into the receiving-tank, and a discharge-pipe leading from the heating-tank into the open settling and cooling tank, substantially as and for the purposes set forth.

9. In a water heater and purifier the combination of a closed purifying-tank, a steam-supply pipe opening into said tank, a closed receiving-tank below said purifying-tank, a valved pipe connecting the upper part of said receiving-tank with said purifying-tank, a water-supply pipe opening into the lower part of said receiving-tank, a closed heating-tank arranged within said receiving-tank, a valved pipe connecting the upper part of said heating-tank with the lower part of said purifying-tank, and a discharge-pipe opening out of the lower part of said heating-tank, substantially as and for the purposes set forth.

10. In a water heater and purifier the combination with a purifying-tank, of two tanks arranged one within the other and each provided with an inlet and an outlet, the inlet of one of said tanks and the outlet of the other communicating with said purifying-tank, said inlet communicating with said purifying-tank below the water-level, and means for heating water contained in the purifying-tank, substantially as and for the purposes set forth.

CHARLES F. BAINTER.

Witnesses:
ALFRED I. TOWNSEND,
JAMES R. TOWNSEND.